Figure 1:
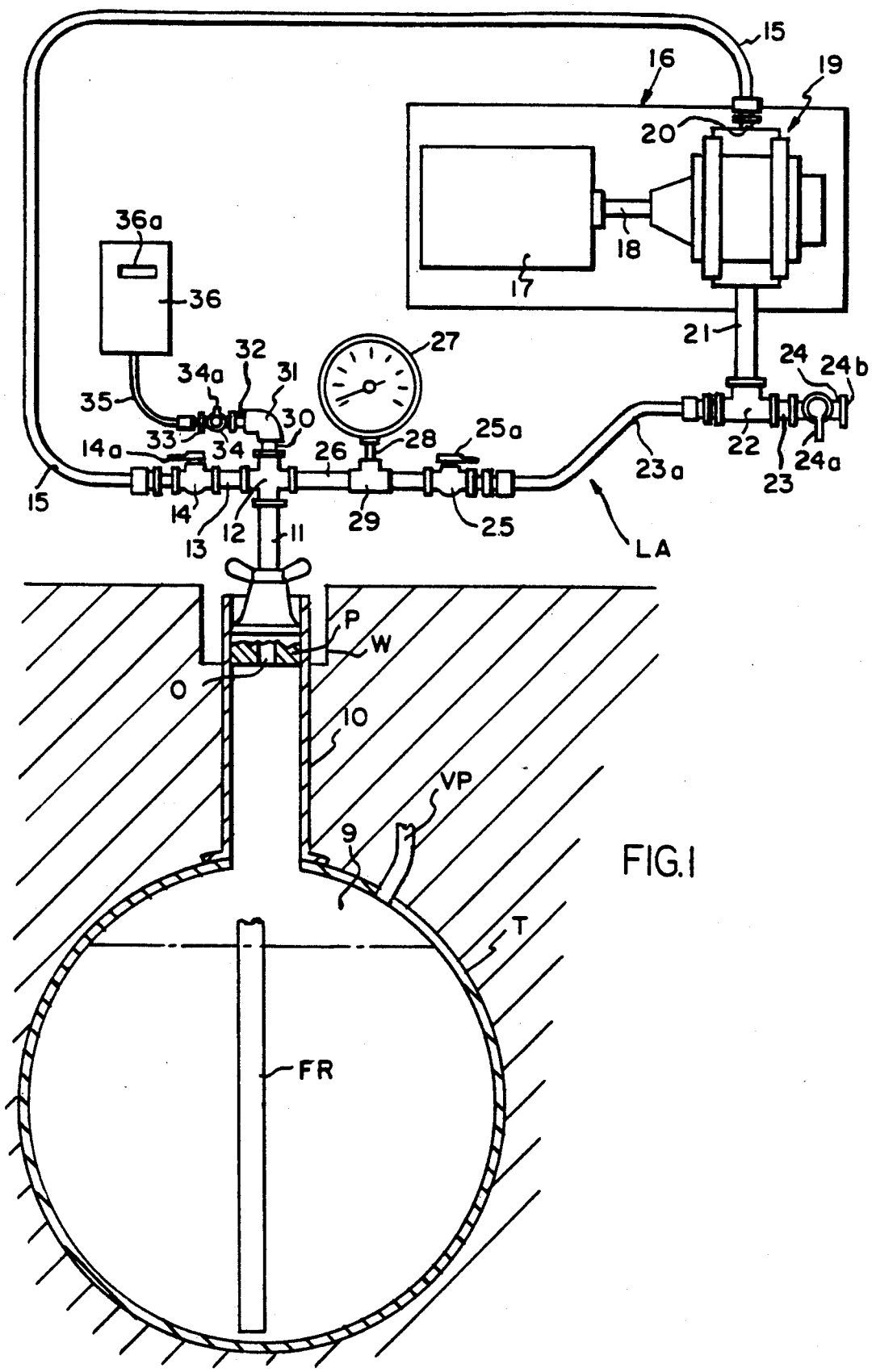

United States Patent [19]

Horner

[11] Patent Number: 5,216,914
[45] Date of Patent: Jun. 8, 1993

[54] METHODS AND SYSTEMS FOR THE NEGATIVE PRESSURE TESTING OF UNDERGROUND STORAGE TANKS CONTAINING HIGHLY VAPOROUS HYDROCARBON LIQUIDS

[75] Inventor: Jack R. Horner, Bay City, Mich.

[73] Assignee: Horner Creative Products, Inc., Bay City, Mich.

[21] Appl. No.: 861,263

[22] Filed: Mar. 31, 1992

[51] Int. Cl.⁵ ............................................. G01M 3/34
[52] U.S. Cl. ...................................................... 73/49.2
[58] Field of Search .................................. 73/49.2, 40

[56] References Cited

U.S. PATENT DOCUMENTS

| | | | |
|---|---|---|---|
| 2,853,874 | 9/1958 | Mennesson | 73/40 |
| 2,912,852 | 11/1959 | Trinneer | 73/49.2 |
| 3,580,055 | 5/1971 | White | 73/49.3 |
| 4,281,534 | 8/1981 | Hansel | 73/49.2 |
| 4,386,525 | 6/1983 | Mooney | 73/49.2 |
| 4,462,249 | 7/1984 | Adams | 73/40.5 A |
| 4,474,054 | 10/1984 | Ainlay | 73/49.2 |
| 4,571,987 | 2/1986 | Horner | 73/49.2 |
| 4,618,268 | 10/1986 | Horner | 374/115 |
| 4,646,560 | 3/1987 | Maresca, Jr. et al. | 73/49.2 |
| 4,649,739 | 3/1987 | Horner | 73/49.2 |
| 4,885,931 | 12/1989 | Horner | 73/49.2 |

Primary Examiner—Hezron E. Williams
Assistant Examiner—Michael Brock
Attorney, Agent, or Firm—Learman & McCulloch

[57] ABSTRACT

A method and system for detecting a leak in a high vapor-evolving hydrocarbon liquid underground storage tank filled incompletely with the liquid, wherein there is a projecting fill pipe connected with the ullage which is filled with hydrocarbon vapor and air. A vacuum source is connected to the fill pipe for withdrawing the atmosphere of the ullage and imposing a prescribed negative pressure. While some of the drawn off vapor and much of the air is exhausted to atmosphere, a significant portion of the ullage content is recirculated to build the relative proportion of hydrocarbon vapor to air in the ullage. The ullage is then isolated from the vacuum source and atmosphere, and allowed to stabilize over a predetermined time period with a reduced rate of hydrocarbon vapor release into the ullage. The recirculation and stabilization are then repeated to achieve further saturation of the ullage with gasoline vapor and vacuum is applied to the ullage to reach a predetermined threshold negative pressure in the ullage. Over a predetermined time period successive negative pressure readings are taken to determine if there is a rate of decay which indicates the existence of a leak in the tank.

19 Claims, 1 Drawing Sheet

METHODS AND SYSTEMS FOR THE NEGATIVE PRESSURE TESTING OF UNDERGROUND STORAGE TANKS CONTAINING HIGHLY VAPOROUS HYDROCARBON LIQUIDS

BACKGROUND OF THE INVENTION

This invention relates to leak detection systems and methods of the type employed with underground tanks for storing highly vaporous liquids such as gasoline at gasoline service stations. Such storage tanks, which may consist of, for example, a twenty-six foot long cylindrical tank having a diameter of eight feet, and holding perhaps ten thousand gallons of gasoline, are conventionally buried in the earth below the frost line, and it is necessary to periodically test such storage tanks for leaks. Normally, unaffiliated private equipment operators with portable equipment are employed by station operators to perform leak tests. The methods of testing have varied widely. Typical commercial methods of testing today do so by measuring the changes in volume of the liquid contained in the tank over a period of time by various methods and typically also it is necessary to compensate for temperature change, because changes in temperature effect changes in volume. Because the temperature of the various strata of liquid in a tank differs, any temperature reading taken at one location in a tank is not accurate for all of the liquid in the tank and thus taking an average temperature and correcting for temperature change creates considerable problems for the testing equipment, and may not always provide the accuracy which is deemed necessary for safety. The methods and equipment described in some of the following prior art patents, which I incorporate herein by reference, are exemplary of testing methods which have been proposed:

| | |
|---|---|
| 2,853,874 | Mennesson |
| 2,912,852 | Trinneer |
| 3,580,055 | White |
| 4,281,534 | Hansel |
| 4,462,249 | Adams |
| 4,386,525 | Mooney |
| 4,474,054 | Ainlay |
| 4,571,987 | Horner |
| 4,618,268 | Horner |
| 4,646,560 | Maresca |
| 4,649,739 | Horner |
| 4,885,931 | Horner |

Previously, it has been possible to test storage tanks for heavier hydrocarbon liquids such as diesel fuel by applying a vacuum or negative pressure to the tank ullage, isolating the tank, and then simply measuring the decay of the negative pressure over a time period. The Trinneer Pat. No. 2,912,852 discloses such a tank testing device. This method has, to my knowledge, not been sufficiently feasible, in my view; with highly vaporous, volatile products such as gasoline which, when placed under a sufficient negative pressure for measuring, react to the negative pressure by vaporizing at a high rate which decreases the negative pressure so rapidly that sensitive tests cannot be performed.

SUMMARY OF THE INVENTION

The present invention solves the problem by slowing or stabilizing the rate of vaporization sufficiently so that a meaningful and safe test, capable of indicating leak losses of 0.10 gallons per hour with a probability of detection of at least 95% and a probability of false alarm of no more than 5% in accordance with federal and state standards, can be performed over a minimum time interval. This is accomplished by utilizing a vacuum creating system and in successive steps bringing the ullage to a sufficiently stabilized predetermined negative pressure threshold level which is within tank safety limits. In the process, air which has accumulated in the ullage is bled off, and the hydrocarbon vapor in the ullage becomes progressively saturated to achieve an equilibrium state in which the vapor pressure remains sufficiently constant. When a sufficient saturation is achieved to approach equilibrium in the ullage, the threshold negative pressure can be imposed and negative pressure readings can be taken over a time interval to determine if the rate of decay is severe enough to indicate that air is entering the tank through a leak or leaks.

One of the prime objects of the invention is to provide a method of measuring leaks in an underground tank containing gasoline or the like which can test the tank without measuring changes in the stored liquid volume and compensating for temperature differentiations in the body of liquid in the tank.

A further object of the invention is to provide a method of testing such leaks which does not seek to obviate or circumvent the natural vaporization of the product, but, rather, seeks to control it.

A further object of the invention is to provide a leak testing system which does not require filling or overfilling of the tank prior to testing, and avoids the need for scheduling a product delivery just prior to the time of test. A corollary object is to avoid the waiting periods incident to this, before testing can be accomplished.

A still further object of the invention is to provide a sufficiently precise, commercially viable method and system for testing the integrity of underground storage tanks for gasoline and like liquids, which is easy to use to detect unacceptable leaks which can create environmental damage and increase the danger of fire and explosion.

Still a further object of the invention is to provide a highly reliable method and system which is fast and accurate, and minimizes the down time when the tank cannot be used.

Other objects and advantages of the invention will become apparent with reference to the accompanying drawings and the accompanying descriptive matter.

IN THE DRAWINGS

FIG. 1 is a schematic end elevational view illustrating the system which is utilized to perform the negative pressure leak testing method.

Referring more particularly to the accompanying drawings, I have shown a typical underground tank, generally designated T, which is buried underground and has a communicating fill tube 10, provided to communicate with the upper portion of the tank T to admit fuel to the tank. As disclosed in the Horner U.S. Pat. No. 4,649,739, the fill pipe 10 extends upwardly to enter a well W situated at ground level, to thereby provide means of filling the tank T when this is necessary. Also provided, as shown in the patent mentioned, is the usual vent pipe VP which extends up through the earth also, and which is normally open at its upper end to prevent the buildup of undue vapor in the tank. The vent pipe VP is closeable by a plug for purposes of the testing procedure.

Still further, a sealed fuel removal suction pipe FR extends from a position down near the bottom of the tank up to a gasoline pump at ground level which is operable to draw liquid from the ground-embedded tank T and dispense it in the usual manner to vehicle fuel tanks.

Normally, when the tank T is in use and not being tested, the upper end of fill pipe 10 is tightly sealed with a removable plumber's plug or other suitable, radially expandable seal. In the present drawing, the usual plumber's plug is shown as replaced by a plug P which is provided as an integral part of a leak testing assembly, generally designated LA, for tank leak testing purposes. The pipe 11 connected to plug P communicates with a fitting 12 which has a pipe connection 13 leading to a manually operable valve 14. Valve 14 is openable and closeable by operating a handle 14a to control the admission of gaseous material to a line 15 leading to a blower motor assembly, generally designated 16. The assembly 16 includes an electric motor 17 having its output shaft 18 connected to drive the Roots blower 19, which has an inlet pipe 20 connected to line 15. The outlet pipe 21 extending from blower 19 connects to a fitting 22.

At one end, fitting 22 communicates with a pipe 23 leading to a similar hand-operated valve 24 provided with a handle 24a for opening the valve to atmosphere at opening 24b. At its opposite end, fitting 22 communicates with a reduced diameter pipe 23a leading to a similar hand-actuated valve 25, communicating with and capable of closing a pipe 26 which returns to fitting 12. Valve 25 can be opened and closed by operating handle 25a. A negative pressure reference gauge 27, indicating pounds of negative pressure, has communication, via a pipe 28 and a fitting 29 in line 26, with tank T, so the pressure in the ullage of the tank is continuously on display. Further, a pipe 30 leads from the upper end of fitting 12 to a fitting 31, having outlet pipe 32 which leads through a fitting 33 having a hand-operated valve 34 fitted with an operating handle 34a. Valves 14, 24, and 25 are the common line valves, purchasable anywhere, which are closeable fully, or movable to any partially open or fully open position. The valve 34, which is normally open during the leak testing procedure, communicates with a line 35 leading to a commercially available, digital manometer pressure sensor 36. This device digitally displays the pressure in the ullage in inches of water at window 36a, and may be connected to a computer which, in the usual manner, records and stores the test data.

THE OPERATION

Tanks of up to 50,000 gallon capacity can be leak tested, however, the maximum negative pressure on the tank top is not to exceed 4 psi or, for the sake of safety, a pressure sensor negative pressure reading of 111.1. When gasoline is the stored liquid, the ullage should not exceed 2,500 gallons or be below 800 gallons.

If there is a water table above the tank bottom, or there is more than one inch of water accumulated in the tank, a conventional water sensor can be incorporated in the tank to operate independently of the present system and indicate leaks which are admitting ground water to the tank. It is assumed in the present case, for purposes of simplicity, that this is not the case, and no water sensor need be utilized.

When testing an underground storage tank containing heavier hydrocarbon products such as diesel fuel, the vapor pressure of the product does not cause a problem when measuring a decay of negative pressure to detect a leak. Testing a product such as gasoline, which has a much higher vapor pressure, in the same way, does not work as effectively as I deem necessary because placing a negative pressure on an ullage which has not been stabilized so considerably increases the rate of vaporization. In simply placing a negative pressure on such an ullage, a significant positive pressure due to this higher rate of vaporization is created, which will accelerate the rate of decay and indicate a leak when none exists. The more negative pressure placed on the ullage, the higher the rate of vaporization, dependant on the volume of the ullage.

In the present system, the volume of the ullage and the head pressure of the liquid in the tank dictates how much vacuum is to be applied to the tank, within safety limits, and this is a calculable maximum negative pressure which I have termed the threshold negative pressure. I will later indicate the manner in which the threshold negative pressure to be applied can be calculated for each tank. Assuming that this calculation has been made for a tank containing gasoline or another highly vaporous liquid, the method of testing for leaks, includes plugging off all of the tank access ports, including the vapor relief line VP, and insertion of the plug P of the test system in place of the normally used plug. Then, valve 14 is opened to communicate the ullage space 9 with the blower 19. Valve 25 is substantially in closed position and valve 24 is substantially fully opened. The blower 19 is operated to draw a mixture of vapor and air from the ullage 9 up through the open valve 14 and line 15 and out opening 24b. When the suction exerted by blower 19 creates approximately fifty percent of the selected negative threshold pressure in ullage 9, valve 25 is throttled to a partially open position which creates additional negative pressure at about half the previous rate until the threshold negative pressure is reached. With blower 19 still operating, valve 24 is throttled to a partially closed position and the valves 24 and 25 are adjusted to hold this threshold negative pressure for a predesignated time period, i.e. one-half hour. When the valve 25 is partially opened, a portion of the vapors drawn off, recirculate back through lines 23a and 26 to the line 13. If required, the exiting gas at opening 24b could be processed to prevent any substantial amount of gasoline vapors from directly entering the atmosphere.

At the end of this initial or first recirculating period, the blower 19 is deenergized and valves 14 and 25 are fully closed. Thereafter the ullage is permitted to stabilize for a predesignated time period, i.e. fifteen minutes. At the end of this time period, during which some decay of negative pressure is observed (i.e. a decay of 3.6 inches of water when the pump-created negative threshold pressure is 107.2) the valve 14 is again opened to communicate line 15 with the blower 19, and valve 24 is fully opened. Then the valves 24 and 25 are throttled to a partially open position. Blower 19 is operated to again slowly bring the ullage to the threshold negative pressure. At this point, valve 25 is partially opened and valve 24 partially closed, and the ullage is maintained at the threshold negative pressure for fifteen minutes with continued operation of blower 19. During this pressure rebuilding and second holding period, some vapor and further air is being purged from the system out opening 24b. Thereafter, the pump 19 is again deenergized and valves 14 and 25 are closed so that the tank can stabilize for another fifteen minutes. Then, after a lesser decay of negative pressure (i.e. 2.5 inches when pump-created negative pressure is 107.2 inches of water), valve 14 is opened and valves 24 and 25 are throttled to partially open position. Blower 19 is again operated to bring the pressure back to the threshold pressure. At this time, valve 25 is partially opened and valve 24 partially closed, while blower 19 continues to operate to hold the threshold negative pressure in the ullage 9, and while purging some gasoline vapor and virtually any remaining air out opening 24b. At the end of a fifteen minute holding and recirculating period, the valves 14 and 25 are closed and pump 19 is turned off. At this point, with the air substantially eliminated and the vapor in the ullage in a virtual condition of saturation, where the vapor pressure is more constant and the rate of vaporization has been very much slowed, the data collection can take place.

It typically takes an hour and a half to place the system in this condition of saturation and the data collection period is also approximately one and one-half hours, assuming that the tank being tested has no measurable leaks. If the tank has a leak and a given decay of negative pressure occurs, it is tested again to be sure, and the station operator is then informed that the tank has a leak. When data is being taken the valves 14 and 25 are closed. The operator will manually, every five minutes, record the negative pressure in inches of water column which is indicated on the digitally displaying pressure sensor 36. The present system will indicate a leak above the water table, when air is entering the tank to cause the decay or loss of negative pressure and is capable of detecting a loss of pressure of as small as 0.0036 p.s.i.

Of course, if there is an outside water table, or water in the bottom of the tank, and a water sensor is being used, the water sensor will indicate that water is entering the tank and causing a water level increase in the usual manner. In this case, if the present system is also to be used, the amount of negative pressure needed for the operating threshold pressure will need to be adjusted to compensate.

AN EXAMPLE

Assuming a gasoline tank having a capacity of 10,000 gallons and an ullage of 1,500 gallons, and that the tank diameter is ninety-six inches and there is no water inside the tank and no water table above the tank bottom, a maximum threshold pressure of 106.8 inches of water column, equivalent to 3.8 pounds of negative pressure (psi), is used. With gasoline, the window in which measurements are taken is fifteen inches so the lower negative pressure within which the system operates is 91.8. In this test, a decay of 10% of the minimum test pressure, or more than 9.18 inches of water column in one hour, indicates that there is a leak in the tank.

EXAMPLE TWO

Assuming the same conditions, except that the tank is an 8,000 gallon gasoline tank with a 800 gallon ullage, a threshold negative pressure of 104.9 inches of water column is calculated by determining that the head pressure of the liquid in the tank (inches of product times the weight of the product) to be overcome is 62.1 inches of water column (2.236 psi). The additional negative pressure band required to detect the leak is 27.8 inches of water column (1 psi), and the additional negative pressure, required to compensate for vaporization under substantially saturation conditions, is fifteen inches of water column (0.54 psi) window. This negative threshold pressure (104.9) is below the 4 p.s.i. negative pressure limitation test proscribed for tank safety purposes. A decay of 10% of the minimum test pressure or 8.99 inches of water in an hour indicates a leak.

In the experimental work which has been accomplished thus far, it has been determined that the near saturation of the ullage must be achieved in successive stages and it has been found that the stages described work best. Before the test is run, it is believed desirable to achieve about 95% or more gas vapor saturation in the ullage 9, and preferably close to 100%. During each stabilization period, the pump is turned off. The vapor pressure of the gasoline vapors in the ullage, which increases and stabilizes with the saturation to a near equilibrium state, allows less of the product to break the surface tension of the liquid and change state from liquid to vapor. With the bleed to atmosphere (24b) which is utilized when the pump is operating, the pump motor is prevented from burning out. Valve 25 is adjusted, as is valve 24, to best hold the threshold pressure during the time the pump is operating. Effectively, the rate of vaporization is slowed or calmed by introducing what may be termed saturation impedance. When testing has been completed, valves 24 and 25 can be opened and an inert gas such as nitrogen connected to opening 24b to initially fill the ullage 9 for safety reasons. Thereafter, the nitrogen can be permitted to be displaced by air and all tank openings restored to normal for operation of the tank in the normal manner.

DATA COLLECTION

Data is recorded every five minutes during the test. The recording continues until the tank passes the test or the minimum test pressure is reached.

As indicated, the system can also be used to check underground tanks containing diesel or heavier oil. In this case, the valve 25 remains closed and no recirculation of vapors to achieve saturation is effected. The blower 19 is simply operated with the valve 14 open and the valve 24 partly or fully open. When the predetermined threshold negative pressure is reached in the ullage 9, valve 14 can be closed and, after a stabilization period of typically 15 minutes, readings can be taken over a time period to indicate the rate of decay of negative pressure, and a possible leak in the tank.

It is to be understood that the embodiments described are exemplary of various forms of the invention only and that the invention is defined in the appended claims which contemplate various modifications within the spirit and scope of the invention.

What I claim is:

1. In a method of detecting a leak in a normally high vapor-evolving hydrocarbon liquid underground storage tank filled incompletely with sad liquid and having a projecting fill pipe connected with the tank ullage which is filled with hydrocarbon vapor and air pockets; the steps of:

(a) inserting a fill pipe plug mechanism incorporating passage mean communicating with said ullage, and communicating said passage means with a conduit system connected to a vacuum source and an outlet for withdrawing the atmosphere of said ullage and imposing a negative pressure thereon;

(b) utilizing said vacuum source to draw off a portion of the ullage content;

(c) bleeding off a significant portion of the ullage content withdrawn out said outlet while returning a portion to said conduit system and building the relative proportion of hydrocarbon vapor to air in said ullage;

(d) discommunicating said ullage from said outlet while disabling said vacuum source, and allowing said air-hydrocarbon vapor mix to stabilize during a stabilization period with a consequent reduced rate of hydrocarbon vapor release into said ullage;

(e) repeating at least steps (b) and (c) until the ullage content hydrocarbon vapor is sufficiently saturated that leakage tests can be performed at a predesignated negative pressure; and (f) over a predetermined time period taking successive negative pressure readings to indicate a possible rate of decay greater than a predetermined rate which would indicate a leak in the tank.

2. The method of claim 1 wherein step (d) is also repeated after steps (b) and (c) are repeated the first time, before step (f) is performed.

3. The method of claim 2 wherein steps (b) and (c) are repeated twice and step (d) once, before step (f) is performed.

4. The method of claim 2 wherein, after each stabilization period as specified in part d, the rate of decay is decreased.

5. The method of claim 1 wherein a saturation of near 100% is achieved before step (f) is performed.

6. The method of claim 1 wherein the air in air pockets in said ullage is substantially eliminated before step (f) is performed.

7. The method of claim 1 wherein prior to step (c) substantially all of the ullage drawn off is bled off through said outlet until a first predetermined negative pressure is reached in said ullage.

8. The method of claim 7 wherein step (c) is continued until a second predetermined threshold negative pressure is reached in said ullage, and is continued thereafter for a time at said predetermined threshold negative pressure.

9. The method of claim 8 wherein said first negative pressure is approximately half in value of said second negative pressure.

10. The method of claim 8 wherein the time during which step (c) is continued, once said second negative pressure is reached, is approximately one half hour the first time step (c) is performed, and approximately one quarter hour each in two subsequent repetitions of step (c).

11. The method of claim 10 wherein said stabilizing is practiced during a stabilization period of approximately one quarter of an hour after said first, and a second, step (c) is performed.

12. The method of claim 1 wherein said stabilization period is approximately one quarter of an hour.

13. In a method of detecting a leak in a high vapor-evolving hydrocarbon liquid underground storage tank filled incompletely with the liquid, and having a projecting pipe leading upwardly to ground level connected with the ullage in the tank which is filled with hydrocarbon vapor and air; the steps of:

(a) connecting a pipe communication mechanism incorporating passage means communicating with said ullage, and communicating said passage means with a vacuum source for withdrawing the atmosphere of said ullage and imposing a negative pressure;

(b) repetitively utilizing said vacuum source to draw off ullage content comprising a mix of hydrocarbon vapor and air while building the negative pressure in the ullage, purging a portion of the content drawn off, and building the relative proportion of hydrocarbon vapor to air in said ullage;

(c) when the ullage hydrocarbon vapor is sufficiently saturated that leakage tests can be performed at a predetermined negative pressure, applying a negative pressure to said ullage to reach a predetermined threshold negative pressure in said ullage; and over a predetermined time period taking successive negative pressure readings to indicate a possible rate of decay which would indicate a leak in the tank.

14. The method defined in claim 13 wherein a leak is indicated when a decay per hour of ten percent is observed.

15. A leak detecting system for detecting a leak in a high vapor-evolving hydrocarbon liquid underground storage tank filled incompletely with the liquid and having a communicating pipe leading upwardly from the tank ullage to ground surface level, comprising:

(a) a connection for said pipe having passage means;

(b) a vacuum producing system incorporating a vacuum source connected with said passage means for withdrawing the atmosphere of said ullage and imposing a negative pressure thereon, said vacuum producing system including an upstream portion upstream from said vacuum source and a downstream portion downstream from said vacuum source communicating with outside atmosphere;

(c) a recirculating conduit communicating with said downstream portion, and said upstream portion for returning a portion of said withdrawn atmosphere to said upstream portion;

(d) first valve mechanism for said recirculating conduit for controlling or stopping the volume of flow back to said upstream portion;

(e) second valve mechanism for selectively isolating said vacuum producing system from the outside atmosphere; and (f) negative pressure reading means for indicating the negative pressure imposed on the ullage at time intervals to determine a rate of decay thereof.

16. The leak testing system of claim 15 wherein said downstream portion incorporates a fitting connected to said conduit and an outlet for communicating with the outside atmosphere, and said second valve mechanism is a selectively openable and closable valve mechanism for controlling the volume of flow through sad outlet to meter the volume of flow therethrough.

17. The leak testing system of claim 16 wherein said connection is a plug and a third valve mechanism is disposed in said upstream portion for selectively isolating the ullage.

18. The leak testing system of claim 15 wherein said first and second valve mechanisms are throttleable to various partially open positions.

19. The leak testing system of claim 18 wherein said negative pressure reading means includes a negative pressure gauge of a sensitivity to read out in at least tenths of an inch of water column.

* * * * *

UNITED STATES PATENT AND TRADEMARK OFFICE
CERTIFICATE OF CORRECTION

PATENT NO. : 5,216,914
DATED      : June 8, 1993
INVENTOR(S) : Jack R. Horner

It is certified that error appears in the above-identified patent and that said Letters Patent is hereby corrected as shown below:

Column 6, line 59, change "sad" to -- said --.

Column 8, line 54, change "sad" to -- said --.

Signed and Sealed this

Eleventh Day of January, 1994

Attest:

BRUCE LEHMAN

Attesting Officer

Commissioner of Patents and Trademarks